UNITED STATES PATENT OFFICE 2,466,019

COMPOSITIONS OF REDUCED TOXICITY, CONTAINING ANTIMONY AND 1,2-DIHYDROXYBENZENE DISULFONIC ACID

Ernst A. H. Friedheim, New York, N. Y.

No Drawing. Application December 14, 1946, Serial No. 716,423

6 Claims. (Cl. 167—68)

This invention relates to the preparation of compositions of antimony-containing organic compounds and the preparation of these compounds proper. It has particular relation to the preparation of compositions and/or compounds of high therapeutic activity and low toxicity of this type. It has been found that complex organic compounds of antimony showing a high therapeutic activity and low toxicity may be obtained by proceeding in the following manner.

A complex organic compound containing 1 atom of trivalent antimony is treated in a substantially neutral aqueous medium with 1,2-dihydroxybenzene-3,5-disulfonic acid or a water soluble salt of this acid, the latter being used in such an amount that the final composition or product contains more than 2 mols and up to 10 mols, preferably up to 3.5 mols of the 1,2-dihydroxybenzene-disulfonic acid compound. Said acid is denoted hereinafter as "compound I." It has been found that the products thus formed have a high therapeutic activity and an unexpectedly low toxicity in comparison to the antimony compound used as a starting material.

*Example 1.*—$\frac{1}{10}$ mol of sodium antimonyl citrate are dissolved in water to a 10% solution, and $\frac{3}{10}$ mol of the disodium salt of compound I are added to the solution which is then neutralized by the addition of $\frac{3}{10}$ mol of sodium bicarbonate. The dissolved product may be obtained in solid condition by evaporation under vacuum.

Instead of first dissolving the citrate and then adding the salt of compound I and the sodium bicarbonate, these ingredients may be mixed with each other in dry condition and the mixture may then be dissolved in the necessary amount of water.

*Example 2.*—To a 10% aqueous solution containing $\frac{1}{10}$ mol of antimonyl-di-pyrocatechol-sodium disulfonate of the probable formula

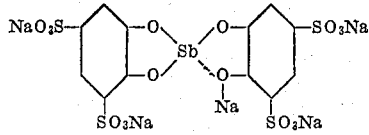

1.5 mols of the disodium salt of compound I are added and the pH of the reaction mixture is adjusted to 7.0, for example by adding the necessary arount of NaHCO₃. The solution thus obtained shows a considerably reduced toxicity in comparison with the starting solution.

Instead of first preparing the antimonyl-pyrocatechol-sodium disulfonate and treating it with compound I, the solution obtained in Example 2 may also be prepared in one step, by treating antimony oxide or hydroxide with the necessary amount of compound I in the presence of water and neutralizing the solution.

*Example 3.*—$\frac{3}{10}$ mol of pyrocatechin-disulfonic acid disodium salt are dissolved in 500 cc. of water and $\frac{1}{10}$ mol of antimony hydroxide is added to the solution, which is then neutralized with sodium carbonate. The solution is heated for a short time.

*Example 4.*—$\frac{1}{10}$ mol of a compound obtained by the reaction of the sodium salt of thiosalicylic acid in aqueous solution with antimony hydroxide, and having the probable formula

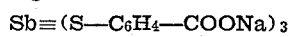

$$Sb\equiv(S-C_6H_4-COONa)_3$$

is dissolved in hot water and to the solution $\frac{3}{10}$ mol of the disodium salt of compound I and $\frac{3}{10}$ mol of NaHCO₃ are added.

*Example 5.*—$\frac{1}{10}$ mol of the sodium salt of the complex antimonyl pyrocatechin malonic acid is dissolved in water and to the solution thus formed $\frac{3}{10}$ mol of the disodium salt of compound I are added. To the solution $\frac{3}{10}$ mol of NaHCO₃ are added.

Instead of the sodium salt of the complex antimonyl pyrocatechin malonic acid, an equivalent amount of the sodium salt of the complex antimonyl pyrocatechin levulinic acid may be used in this example.

*Example 6.*—$\frac{1}{10}$ mol of the sodium salt of the complex antimonyl gallic acid malonic acid obtained by dissolving malonic acid in water, neutralizing the solution and adding to it antimonyl gallic acid, are mixed with 3.5/10 mol of the disodium salt of compound I and $\frac{3}{10}$ mol of NaHCO₃. Upon dissolving this mixture in water a complex compound of the ingredients of the mixture is formed.

*Example 7.*—$\frac{1}{10}$ mol of the sodium salt of antimonyl pyrocatechol thioglycollic acid of the probable formula

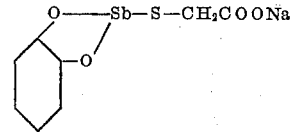

are dissolved in water and $\frac{3}{10}$ mol of the disodium salt of compound I and $\frac{3}{10}$ mol of NaHCO₃ are dissolved in the solution.

*Example 8.*—$\frac{1}{10}$ mol of a compound of the probable formula

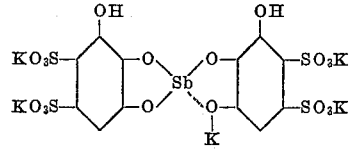

are mixed in aqueous solution with $\frac{3}{10}$ mol of the disodium salt of compound I and $\frac{3}{10}$ mol of NaHCO₃ which are also dissolved in the solution. The compound of the above structural formula may be obtained by reacting the potassium salt of pyrogallol disulfonic acid in neutral aqueous solution with antimony oxide.

*Example 9.*—1/10 mol of the sodium salt of complex antimonyl pyrocatechin tartaric acid of the probable formula

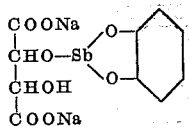

are mixed with $\frac{3.5}{10}$ mol of the disodium salt of compound I and $\frac{3.5}{10}$ mol of NaHCO₃. The mixture can be dissolved in water to a clear solution.

*Example 10.*—1/10 mol of a compound of the probable formula

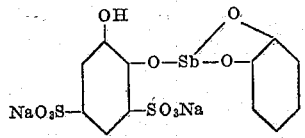

are mixed with $\frac{3.5}{10}$ mols of the disodium salt of compound I, the mixture is dissolved in water and the pH of the solution is adjusted to 7.0 by the addition of NaHCO₃. The compound of the above structural formula may be obtained by reacting in neutral aqueous solution pyrocatechin disulfonic acid with antimonyl pyrocatechin.

*Example 11.*—1 mol of tartar emetic, i. e. potassium antimonyl tartrate of the formula (SbO) OOC.CHOH.CHOH.COOK is mixed with 2.5 mols of the disodium salt of compound I and 2½ mols of NaHCO₃ and the mixture is dissolved in water to form a solution which is adapted to be used for injections in human or veterinarian medicine.

The solution thus obtained is substantially less toxic than a solution containing the same amount of tartar emetic without the addition of compound I.

*Example 12.*—1 mol of tartar emetic is dissolved in water and to the solution 3.5 mols of the disodium salt of compound I and 3.5 mols of NaHCO₃ are added to form a substantially neutral aqueous solution.

In the above Examples 11 and 12, an equivalent amount of the monosodium salt of compound I may be used instead of the disodium salt, or compound I proper may be used with subsequent neutralization of the mixture or of the solution by means of NaHCO₃.

*Example 13.*—1/10 mol of a compound of the probable formula

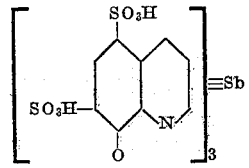

is dissolved in water. To the solution 3/10 mol of the disodium salt of compound I and 3/10 mol of NaHCO₃ are added.

*Example 14.*—1/10 mol of the sodium salt of the complex antimonyl gallic acid levulinic acid, obtainable by reacting levulinic acid in neutral aqueous solution with antimonyl gallic acid, is dissolved in water and to the solution 3/10 mol of the disodium salt of compound I are added. The pH of the solution is adjusted to 7.0 by the addition of NaHCO₃.

*Example 15.*—1/10 mol of the sodium salt of antimonyl pyrogallol thioglycollic acid, obtainable by reacting in neutral aqueous solution thioglycollic acid and antimonyl pyrogallol, are mixed with 3/10 mol of the disodium salt of compound I and 3/10 mol of NaHCO₃, and the mixture thus obtained is dissolved in water in order to obtain a solution which is adapted to be used for injections.

*Example 16.*—1/10 mol of the sodium salt of the complex compound obtainable by dissolving antimonyl pyrocatechin in an aqueous solution of sodium citrate are dissolved in water and to the solution $\frac{3.5}{10}$ mol of the disodium salt of compound I and $\frac{3.5}{10}$ mol of NaHCO₃ are added.

*Example 17.*—1 mol of the sodium salt of antimonyl malonic acid is mixed with 2.8 mols of the disodium salt of compound I and 2.8 mols NaHCO₃, and the mixture is dissolved in water to a substantially neutral solution.

*Example 18.*—1 mol of potassium antimonyl lactate is dissolved in water and to the solution 3.2 mols of the disodium salt of compound I are added.

It has been found that the solutions of the compounds and/or compositions embodying the present invention show a surprisingly low toxicity. I have found, for example, that the L. D.-50 (i. e. the dose tolerated by 50% of experimental animals and killing the other 50%) of the mixture described above in Example 11 administered by interperitoneal injection to mice in aqueous solution containing 2% tartar emetic and adjusted to a pH of 7.0 by the addition of sodium bicarbonate, amounts to 0.219 g. of Sb per kg. of body weight, while the 50% curative dose (i. e. the single dose curing 50% of the treated animals) amounts to 0.0128 g. of Sb per kg. of body weight. Thus the therapeutic index based on the above figures of the mixture described in Example 11 amounts to 17. The analogous figures for tartar emetic per se under similar conditions are: L. D.-50:0.018 g. of Sb per kg. of body weight; 50% curative dose: 0.008 g. of Sb per kg. body weight and the therapeutic index is 2.2.

As other examples of the reduction of toxicity in accordance with the present invention, the following may be mentioned:

The figures obtained with the mixture described in Example 12 under conditions similar to that mentioned in the preceding paragraph are: L. D.-50:0.657 g. of Sb per kg. body weight; 50% curative dose: 0.029 g. of Sb per kg. body weight and therapeutic index 22.

The detoxification obtained with the solution prepared in accordance with Example 2 is as follows: The solution obtained in Example 2 is well tolerated by mice on intraperitoneal application in a dose corresponding to 0.7 g. per kg., of trivalent antimony, while the maximum tolerated dose of the complex antimony compound used as a starting material in Example 2, corresponds to 0.095 g. per kg. of trivalent antimony. The detoxification obtained in this example by the addition of compound I corresponds, therefore, to a factor of 7.37.

Substantially similar effects in the reduction of toxicity are obtained in using the mixtures or solutions described in the other examples.

In addition to the above described ingredients of the compositions according to my present invention, other suitable additions may be used. For example suitable amounts of other buffer salts, such as sodium carbonate or Na₂HPO₄, may be added to the solution or incorporated with the solid ingredients of my composition, the amount of the buffer salts being such as to yield a substantially neutral aqueous solution of the composition. Instead of the disodium salt of compound I, the monosodium salt or the acid proper may be used, which, however, must be converted subsequently into the disodium salt by a suitable neutralizing agent. Water-soluble potassium, lithium, ammonium, calcium salts and water-soluble organic salts of compound I, for example diethylamine or methylglucamine salts may also be used. Furthermore, compounds having a reducing effect such as ascorbic acid, may be added to the mixtures or their solutions. The invention is not limited to the specific proportions stated in the above examples. However, I have found that it is necessary to use compound I in such an amount that the end product (compound, mixture or solution) contains more than 2 mols of compound I or its salts in relation to 1 atom Sb contained in the starting material, and not more than 10 mols, preferably not more than 3.5 mols, of compound I.

It will be apparent that the present invention is not restricted to the details described above and may be carried out with various modifications without departing from the spirit of the invention as defined in the appended claims. It is to be understood that the term "compound of ionizable trivalent antimony" is used in the appended claims to denote compounds of trivalent antimony which in aqueous medium form antimony ions reacting with $H_2S$ to form antimony sulfide.

The products obtained according to the present invention are particularly useful in the treatment of tropical diseases.

Reference is made to my co-pending application Ser. No. 660,859, filed April 9, 1946, of which this is a continuation-in-part.

What is claimed is:

1. A therapeutically active preparation, formed by mixing a compound of ionizable trivalent antimony with a compound selected from the group consisting of 1,2-dihydroxybenzene-3,5-disulfonic acid and its water soluble salts, said composition containing more than 2 mols and not more than 10 mols of said 1,2-dihydroxybenzene derivative for one atom of the trivalent antimony, and showing reduced toxicity in comparison with the toxicity of the antimony compound used as starting material.

2. A therapeutically active, solid preparation, formed by mixing a compound of ionizable trivalent antimony with a compound selected from the group consisting of 1,2-dihydroxybenzene-3,5-disulfonic acid and its water soluble salts, and with an alkaline reagent for adjusting the pH, said composition containing more than 2 mols and not more than 10 mols of said 1,2-dihydroxybenzene derivative for one atom of the trivalent antimony, and showing reduced toxicity in comparison with the toxicity of the antimony compound used as starting material.

3. A therapeutically active injectable solution, formed by mixing in the presence of a solvent a compound of ionizable trivalent antimony with a compound selected from the group consisting of 1,2-dihydroxybenzene-3,5-disulfonic acid and its water soluble salts, and with an alkaline reagent for adjusting the pH, said composition containing more than 2 mols and not more than 10 mols of said 1,2-dihydroxybenzene derivative for one atom of the trivalent antimony, and showing reduced toxicity in comparison with the toxicity of the antimony compound used as starting material.

4. A therapeutically active preparation, formed by mixing a complex organic compound of trivalent antimony with a compound selected from the group consisting of 1,2-dihydroxybenzene-3,5-disulfonic acid and its water soluble salts, and with an alkaline reagent for adjusting the pH, said composition containing more than 2 mols and not more than 3.5 mols of said 1,2-dihydroxybenzene derivative for one atom of the trivalent antimony, and showing reduced toxicity in comparison with the toxicity of the antimony compound used as starting material.

5. A composition formed by mixing tartar emetic with a compound selected from the group consisting of 1,2-dihydroxybenzene-3,5-disulfonic acid and its water-soluble salts and with an alkaline reagent for adjusting the pH, said composition containing more than 2 mols and not more than 3.5 mols of said 1,2-dihydroxybenzene derivative for one atom of trivalent antimony.

6. A composition formed by mixing $Sb(OH)_3$ with a compound selected from the group consisting of 1,2 - dihydroxybenzene - 3,5 - disulfonic acid and its water-soluble salts and with an alkaline reagent for adjusting the pH, said composition containing more than 2 mols and not more than 3.5 mols of said 1,2-dihydroxybenzene derivative for one atom of trivalent antimony.

ERNST A. H. FRIEDHEIM.

REFERENCES CITED

The following references are of record in the file of this patent:

UNITED STATES PATENTS

| Number | Name | Date |
|---|---|---|
| 1,703,732 | Hahl | Feb. 26, 1929 |
| 1,988,576 | Schmidt | Jan. 22, 1935 |
| 2,215,430 | Schmidt | Sept. 17, 1940 |

OTHER REFERENCES

Jancso et al.: Zeitschrift f. Immunitatsschutz, vol. 84 (1935), page 289.